United States Patent [19]

Nitta

[11] 4,079,354
[45] Mar. 14, 1978

[54] DATA PROCESSING SYSTEM WITH IMPROVED READ/WRITE CAPABILITY

[75] Inventor: Atsushi Nitta, Kawasaki, Japan

[73] Assignee: Panafacom Limited, Kawasaki, Japan

[21] Appl. No.: 775,877

[22] Filed: Mar. 9, 1977

[30] Foreign Application Priority Data

Mar. 18, 1976 Japan .................................. 51-28590

[51] Int. Cl.² .............................................. H04Q 9/00
[52] U.S. Cl. ......................... 340/147 R; 340/147 LP; 340/152 R
[58] Field of Search ................... 340/147 R, 152, 153, 340/147 LP, 147 C

[56] References Cited

U.S. PATENT DOCUMENTS

3,665,398    5/1972    Kawai .......................... 340/147 LP

Primary Examiner—Harold I. Pitts
Attorney, Agent, or Firm—Staas & Halsey

[57] ABSTRACT

Described is a data processing system with an improved data processing operation which is comprised of a central processing unit, a main memory unit, a plurality of input/output control units and a common bus which interconnects all of the above units, wherein the common bus includes at least a data channel, an address channel and a tag channel. The tag channel consists of at least a "write service in" line and a "read service in" line, wherein the "write service in" line transfers a signal which indicates, when the write operation is being conducted, whether or not the information on the data channel and the address channel are available, while the "read service in" line transfers a signal which indicates, when the read operation is being conducted, whether or not the information on the address channel is available, whereby a write operation and a read operation are alternately specified in the system without errors. Further, a single means for providing a bus busy signal is mounted in the system. After one of the data processing unit or input/output control units has requested to occupy the common bus for carrying out the write operation or for carrying out the read operation, and after such occupation of the common bus, the bus busy signal is provided from the single means.

6 Claims, 7 Drawing Figures

| I | II | III | IV | | V |
|---|---|---|---|---|---|
| DATA CHANNEL | DATA BUS INFO 00 ~ 15 | DB00~ DB15 | M S | S M | 16 |
| | DATA BUS PARITY UPPER, LOWER | DBPU DBPL | M S | S M | 2 |
| ADDRESS CHANNEL | ADDRESS BUS INFO 00 ~ 15 | AB00~ AB15 | M | S | 16 |
| CONTROL CHANNEL | WORD | WORD | M | S | 1 |
| | PARITY AVAILABLE | PAVL | S | M | 1 |
| TAG CHANNEL | WRITE SERVICE IN | WSVi | M | S | 1 |
| | READ SERVICE IN | RSVi | M | S | 1 |
| | SERVICE OUT | SRVO | S | M | 1 |
| INTERLOCK CHANNEL | BUS BUSY | BBSY | CPU | X | 1 |
| | OPERATIONAL OUT | OPLO | ditto | ditto | 1 |
| SCANNING CONTROL CHANNEL | REQUEST DATA | RQDT | S | CPU | 1 |
| | ACKNOWLEDGE DATA | ACDT | CPU | Y | 1 |
| | SELECTION FIXED DATA | SFXD | S | CPU | 1 |

DATA PROCESSING SYSTEM WITH IMPROVED READ/WRITE CAPABILITY

BACKGROUND OF THE INVENTION

The present invention generally relates to data processing systems, and more particularly relates to a method for interconnecting a central processing unit, a memory unit and a plurality of input/output control units in a system by way of a single common bus.

In a data processing system, particularly in a small-scale data processing system of the prior art, a central processing unit, a memory unit and a plurality of input/output control units are interconnected by way of a common bus, wherein information is transferred by way of the common bus. This common bus consists of a data channel, an address channel, a control channel, a tag channel, an interlock channel and a scanning control channel, wherein the control channel is provided with a data line used for indicating the transmission of the data, and, further, wherein the interlock channel is provided with a "service in" line. When a write operation is required, a master unit provides both the address information and the write information, and at the same time, the master unit changes the state of the data line (in the control channel) to the logic 1. After this step, the master unit changes the state of the "service in" line (in the interlock channel) to the logic 1, and then the write operation begins. While, when a read operation is required, a master unit provides the address information, and at the same time, the master unit changes the state of the data line to the logic 0. After this, the master unit changes the state of the "service in" line to the logic 1 and keeps the same state, during which the read operation is being conducted.

In the above-mentioned data processing system of the prior art, since either the write operation or the read operation is selectively conducted in accordance with the state of the data line, that is, the logic 1 or the logic 0, respectively, if an error occurs in the data line, it will then be impossible to conduct both the write operation and the read operation correctly. This is one of the defects of the prior art. Further, this kind of error often occurs in the data line. This is because, in the data processing system of the prior art, the so-called bus busy signal is individually provided by each of the input/output control units after one of the corresponding input/output control units has requested to occupy the common bus for carrying out the write operation or for carrying out the read operation and after such occupation of the common bus is realized.

SUMMARY OF THE INVENTION

Therefore, it is an object of the present invention to provide a data processing system in which the write operation can be conducted correctly when one of the units in the system requests the use of the common bus for writing the required data, and also the read operation can be conducted correctly when one of the units in the system requests the use of the common bus for reading the required data.

BRIEF DESCRIPTION OF THE DRAWINGS

The present invention will be more apparent from the ensuing description with reference to the accompanying drawings wherein.

DESCRIPTION OF THE PREFERRED EMBODIMENT

Figure 1:
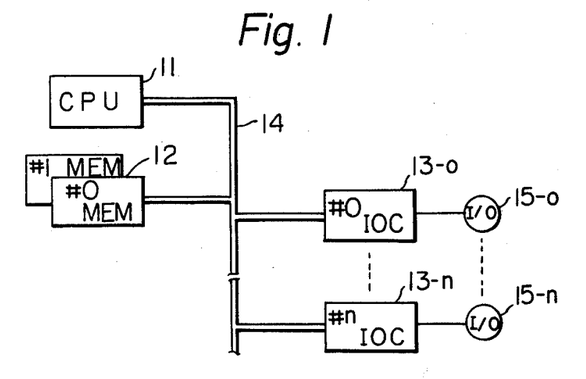
FIG. 1 shows a data processing system to which the present invention is applied.

FIG. 1 shows a data processing system to which the present invention is applied. In FIG. 1, a central processing unit (CPU) 11, a main memory (MEM) 12 and its extensions (#0, #1) and a plurality of input/output control units (IOC) 13-o through 13-n are interconnected by way of a single common bus 14. Each of the input/output control units 13-o through 13-n is, respectively, provided with input/output devices (I/O) 15-o through 15-n. The input/output control units 13-o through 13-n are interconnected one after another by way of the ACDT line (described later in detail). Consequently, the control information from the central processing unit 11 is transmitted sequentially from the input/output control unit 3-o, which is located closest to the central processing unit 11, to the input/output control unit 3-n, which is located furthest from the central processing unit 11. Thereby, one input/output control unit acquires a higher priority order to use the common bus 14 than that of another input/output control unit, which is located further from the central processing unit 11.

Figure 2:
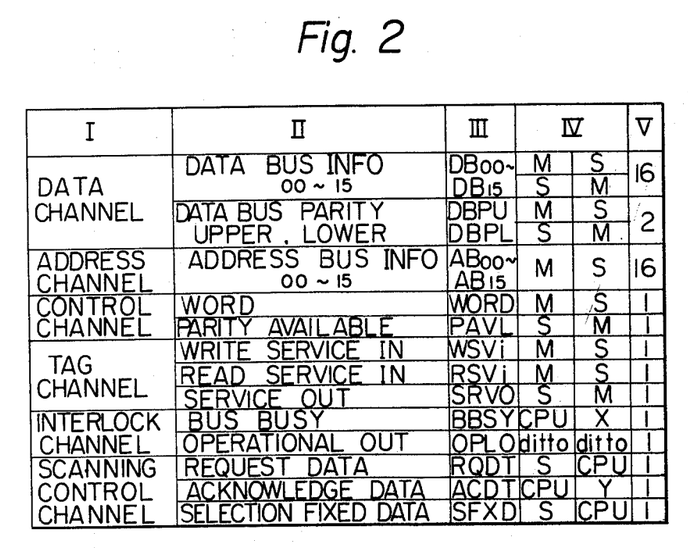
FIG. 2 provides a table used for explaining the details of the common bus 14 of FIG. 1, according to the present invention.

FIG. 2 provides a table used for explaining the details of the common bus 14 shown in FIG. 1. As shown in column I of the table, the common bus 14 (FIG. 1) consists of a data channel, an address channel, a control channel, a tag channel, an interlock channel and a scanning control channel. Referring to columns I and II of the table, a "Data Bus Information" signal and also a "Data Bus Parity" signal are transferred over the data channel. An "Address Bus Information" signal is transferred over the address channel. The "Word" signal and the "Parity Available" signal are transferred over the control channel. The "Write Service In" signal, the "Read Service In" signal and the "Service Out" signal are transferred over the tag channel. The "Bus Busy" signal and the "Operational Out" signal are transferred over the interlock channel. The "Request Data" signal, the "Acknowledge Data" signal and the "Selection Fixed Data" signal are all transferred over the scanning control channel. Each of the above-mentioned signals is referenced by corresponding symbols, which symbols are shown in column III of the table. In column IV of the table, the symbol M indicates a master unit, and the symbol S indicates a slave unit. The symbol CPU indicates the central processing unit 11. The symbol X indicates all the units shown in FIG. 1 other than the CPU 11. The symbol Y indicates a selected one of the units shown in FIG. 1 other than the CPU 11. The units shown in the left side of the column IV respectively act as transmitters, while the units shown in the right side of the column IV respectively act as receivers. Column V of the table shows the number of the signal lines. As apparent from the table, the data channel has sixteen data bus lines ($DB_{00}$) through ($DB_{15}$), which data bus lines transmit 16 bits of data or 8 bits of data. The data channel also has both one data bus parity line (CDPU) and another data bus parity line (DBPL). The address channel has sixteen address bus lines ($AB_{00}$) through ($AB_{15}$), which address bus lines can transmit 16 bits of address information. The control channel has a word line (WORD) which attains the logic 1 state when the data to be transmitted is composed of 16 bits of data, that is, a so-called word, while the word line (WORD) also attains the logic 0 state when the data to be transmitted is composed of 8 bits of data, that is, a so-called byte. The control channel also has a parity available line (PAVL) which transmits a signal for instructing whether or not a master unit has to perform a parity check of the data transmitted from a slave unit. The tag channel has a "write service in" line (WSVi) which transmits a signal for instructing a slave unit to perform a write operation generated by the master unit, a "read service in" line (RSVi) which transmits a signal for instructing a slave unit to perform a read operation generated by the master unit, and a "service out" line (SRVO) which transmits a signal from a slave unit to a master unit, which signal indicates that the slave unit has responded to the write service in signal WSVi or to the read service in signal RSVi. The interlock channel has a bus busy line (BBSY) which transmits a signal for indicating that the common bus 14 (FIG. 1) is now busy. The interlock channel also has an operational out line (OPLO) which transmits a signal from the CPU 11 (FIG. 1) for resetting all the units and for returning these units to their respective initial states, this signal being provided when, for example, a power supply is activated. The scanning control channel has a request data line (RQDT), an acknowledge data line (ACDT) which transmits a signal for indicating that the CPU 11 (FIG. 1) has responded to the request data signal transmitted over the request data line (RQDT), and a selection fixed date line (SFXD). The selection fixed data line transmits a signal which indicates that one of the input/output control units, which provides the request data to the request data line, has responded to the acknowledge data signal.

In a data processing system of the prior art, (1) the write service in line (WSVi) and the read service in line (RSVi) of the tag channel are not separated. Both the write service in line (WSVi) and the read service in line (RSVi) comprise a single service in line, and (2) the tag channel further includes a data line. When this data line is in the logic 1 state, a write operation is conducted; while, when this data line is in the logic 0 state, a read operation is conducted.

As mentioned above, in a data processing system of the prior art, the write operation and the read operation are discriminated in accordance with the logic states 1 and 0 of the data line, respectively. Therefore, as previously mentioned, if an error occurs in the data line, it will be difficult to correctly conduct both the write operation and the read operation.

In the present invention, the bus busy signal is not individually provided from the respective input/output control units, but is provided only from a selected one of the units in the system. For example, the bus busy signal is provided only from the central processing unit. Thus, the write operation and the read operation are alternately conducted without errors. Further, a simple data processing system may be constructed, in which system easy processing of the data may be realized.

Figure 3:
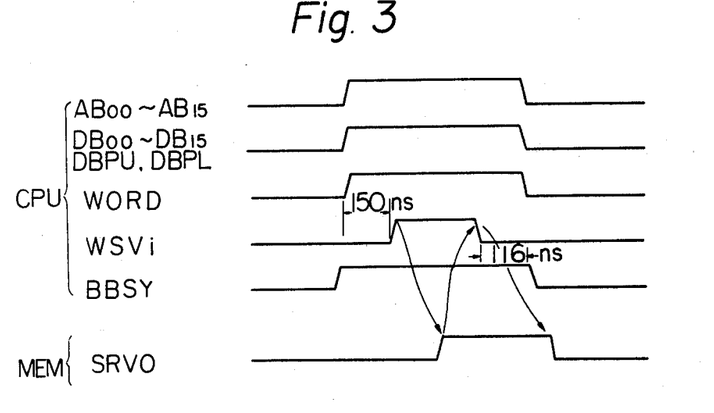
FIG. 3 depicts a timing chart of a write operation for the central processing unit 11 of FIG. 1 with respect to the memory 12 of FIG. 1, according to the present invention.

FIG. 3 depicts a timing chart of the write operation for the central processing unit (CPU) 11 with respect to the memory (MEM) 12, according to the present invention.

Figure 4:
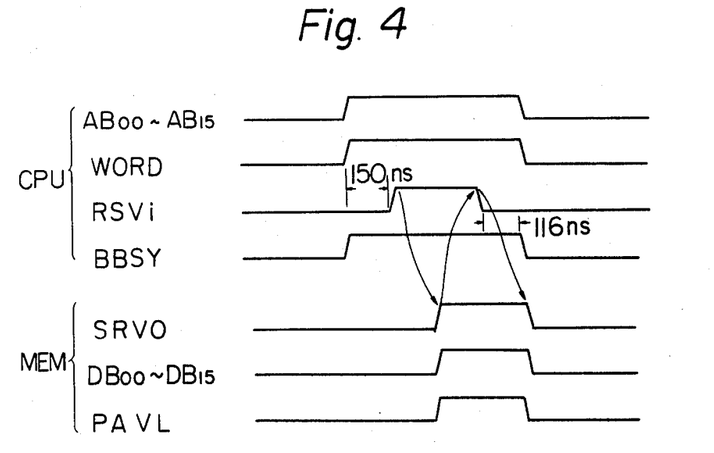
FIG. 4 depicts a timing chart of a read operation for the central processing unit 11 of FIG. 1 with respect to the memory 12 of FIG. 1, according to the present invention.

FIG. 4 depicts a timing chart of the read operation for the central processing unit (CPU) 11 with respect to the memory (MEM) 12, according to the present invention.

Figure 5:
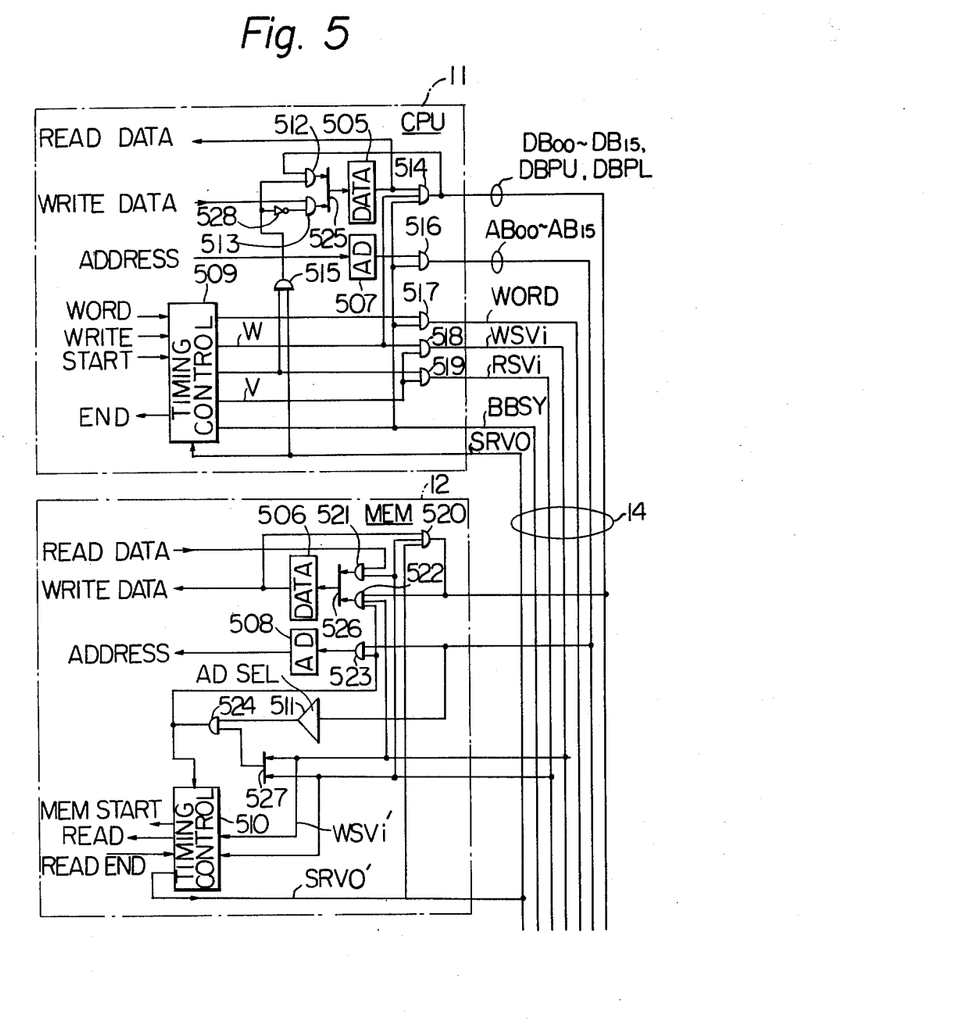
FIG. 5 is a block diagram showing both a part of the central processing unit 11 of FIG. 1 and the memory 12 of FIG. 1, both of which operate in accordance with the timing chart shown in FIG. 3 or FIG. 4.

FIG. 5 is a block diagram showing both a part of the central processing unit and the memory, both of which operate in accordance with a timing chart shown in FIG. 3 or FIG. 4.

In FIG. 5, the reference numerals 11, 12 and 14, respectively, indicate the members which have already been explained by previously referring to FIG. 1, and the symbols ($DB_{00}$ through $DB_{15}$, DBPU, DBPL), ($AB_{00}$ through $A_{15}$), (WORD), (WSVi), RSVi), (BBSY) and (SRVO), respectively indicate the signal lines which have already been explained by referring to the table shown in FIG. 2. It should be noted that, in the central processing unit 11 of FIG. 5, only a part thereof is shown. In FIG. 5, the reference numerals 505 and 506 respectively indicate data registers (DATA); the reference numerals 507 and 508 respectively indicate address registers (AD); the reference numerals 509 and 510 respectively indicate timing control circuits; the reference numerals 512 through 524 respectively indicate AND gates; the reference numerals 525 through 527 respectively indicate OR gates; and the reference numeral 528 indicates a NOT gate. The reference numeral 511 indicates an address selection circuit. The address selection circuit 511 is comprised of an address decoder and operates to always indicate whether or not the memory 12 has been selected for the write operation or the read operation by means of the address bus lines $AB_{00}$ through $AB_{15}$ in the common bus 14. When the memory 12 is selected for the write operation or the read operation, the address selection circuit 511 produces a logic 1 signal.

FIG. 3 depicts a timing chart of the write operation for the central processing unit 11 with respect to the memory 12, both of which are shown in FIG. 5. Referring to both FIGS. 3 and 5, the write data (WRITE DATA) to be written in the memory 12 is stored in the data register 505. The write data in FIG. 5 is composed of a so-called word, that is, 16 bits of data. At the same time, the address information (ADDRESS), at which address the write data should be written in the memory 2, is stored in the address register 507. The signal (WORD) contains information which indicates that the write data to be written in the memory 12 is composed of a so-called word, that is, 16 bits of data. The signal (WORD) is applied to the timing control circuit 509. Then, the signal (START) is applied to the timing control circuit 509. When the signal (START) is applied to this circuit 509, the circuit 509 subsequently provides the logic 1 signal to the bus busy line (BBSY) in the common bus 14. When the bus busy line (BBSY) attains the logic 1 state (see the timing chart corresponding to BBSY in FIG. 3), the AND gates 514, 516 and 517 are opened. Then, the write data (WRITE DATA), the address information (ADDRESS) and the signal (WORD) are provided, respectively, to the corresponding lines in the common bus 14 (see the timing chart corresponding to $AB_{00}$ to $AB_{15}$, $DB_{00}$ to $DB_{15}$, DBPU, DBPL and WORD in FIG. 3). After this, a signal W is provided from the timing control circuit 509. When the AND gate 518 opens due to the signals W and V, the write service in line (WSVi) attains the logic 1 state (see the timing chart corresponding to WSVi in FIG. 3). In the memory 12, when the address selection circuit 11 detects that the address information (ADDRESS) transferred through the address bus line ($AB_{00}$ to $AB_{15}$) is directed to the memory 12, the address selection circuit 11 is then caused to produce a logic 1 signal. This signal V is provided from the timing control circuit 119 after about a 150 ns (nano-second) delay with respect to the timing of the application of the signal (START). The delay of 150 ns is shown in FIG. 3. During the delay of 150 ns, the information transferred over both the data channel and the address channel is not available due to the skew of transmission signals. Accordingly, the logic 1 signal V opens the AND gate 518. Thereafter, the logic 1 signal is transmitted over the write service in line (WSVi). In the memory 12, the write service in signal WSVi which is a logic 1, opens the OR gate 527 and the AND gate 522. Subsequently, the AND gate opens, and accordingly and AND gate 523 opens. The OR gate 526 also is opened by means of the AND gate 522. By way of the AND gate 522 which is now open, both the write data and the data bus parity supplied through the data bus line ($DB_{00}$ to $DB_{15}$, DBPU, DBPL) are stored in the data register 506. By way of the AND gate 523 which is open now, the address information supplied through the address bus line ($AB_{00}$ to $AB_{15}$) is stored in the address register 508. By way of the AND gate 524 which is now open, the address selection signal from the address selection circuit 511 is applied to the timing control circuit 510, thereby activating the circuit 510. Thereafter, a memory start signal (indicated as MEM START in FIG. 5) is provided from the circuit 510 after a predetermined time delay. The memory start signal (MEM START) activates a memory device (not shown). At the same time, the timing control circuit 510 produces a service out signal, which signal is transferred over the service out line (SRVO', SRVO) and is in the logic 1 state (see the timing chart corresponding to SRVO in FIG. 3). The service out signal is applied to the timing control circuit 509 in the central processing unit 11 through the service out line (SRVO).

This circuit 509 then produces a signal V which has become a logic 0 now. The logic 0 signal V closes the AND gate 518, and the signal over the write service in line (WSVi) attains the logic 0 state (see the timing chart corresponding to WSVi in FIG. 3). After about a 116 ns delay, the bus busy signal on the line (BBSY) attains a logic 0 state. The 116 ns delay is shown in FIG. 3. Subsequently, the AND gates 514, 516 and 517 close, and all the signals on the lines ($DB_{00}$ to $DB_{15}$, DBPU, DBPL), ($AB_{00}$ to $AB_{15}$) and (WORD) respectively achieve the logic 0 states. Accordingly, in the memory 12, the OR gate 527 and the AND gate 524 close. The write service in signal which is now logic 0 is applied to the timing control circuit 510 through lines (WSVi) and WSVi'). After this, the timing control circuit 510 provides the service out signal which is now logic 0 to the lines (SRVO') and (SRVO). The write data which is stored in the data register 506 is written at a specified address in the memory device (not shown) when various operations as mentioned above are being conducted.

FIG. 4 depicts a timing chart of the read operation for the central processing unit 11 with respect to the memory 12. Referring to both FIGS. 4 and 5, the address information (ADDRESS), at which the desired read data should be read out from the memory 12, is transmitted by way of the address bus line ($AB_{00}$ to $AB_{15}$). Since the read data to be read out from the memory 12 is composed of 16 bits of data, the signal on the line (WORD) acquires a logic 1 state. At the same time, the timing control circuit 509 changes the bus busy signal on the line (BBSY) to logic 1 (see the timing chart corresponding to $AB_{00}$ to $AB_{15}$, WORD and BBSY in FIG. 4). After about a 150 ns delay, the timing control circuit 509 changes the read service in signal on the line (RSVi) to logic 1 (see the timing chart corresponding to RSVi in FIG. 4). In the delay of 150 ns, the information transferred over the address channel is not available due to the skew of transmission signal. After the memory 12 has received the address information, the logic 1 word signal and the logic 1 bus busy signal, the desired read data (READ DATA) is then transferred from the data register 506 in the memory 12 to the data register 505 in the central processing unit 11 by way of the data bus line ($DB_{00}$ to $DB_{15}$, DBPU, DBPL) (see the timing chart corresponding to $DB_{00}$ to $DB_{15}$ in FIG. 4). The timing control circuit 510 produces the service out signal which is logic 1 to the service out line (SRVO) (see the timing chart corresponding to SRVO in FIG. 4). The service out signal is applied to the timing control circuit 509 in the central processing unit through the line (SRVO), whereby this circuit 509 produces a signal V which is now logic 0. The logic 0 signal V closes the AND gate 519, and the read service in line (RSVi) acquires the logic 0 state (see the timing chart corresponding to RSVi in FIG. 4). After about a 116 ns delay, the bus busy signal on the line (BBSY) also attains the logic 0 state. The 116 ns delay is shown in FIG. 4. At the same time, the timing control circuit 510 provides the service out signal which is now logic 0. In FIG. 4, the timing chart corresponding to PAVL indicates the parity available signal. When the parity available signal is a logic 1, a parity check is performed on the read data (READ DATA).

Figure 6:
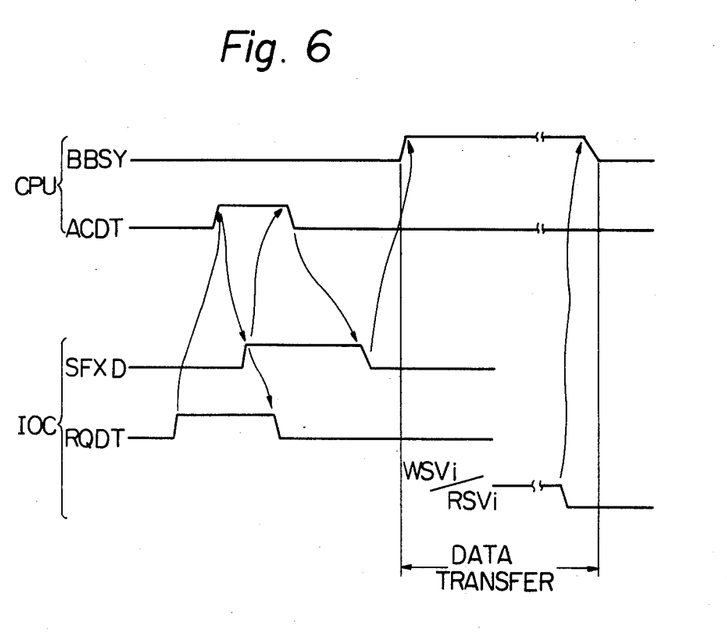
FIG. 6 depicts a timing chart of a bus occupation request operation for a unit in the data processing system of FIG. 1, according to the present invention.
Figure 7:
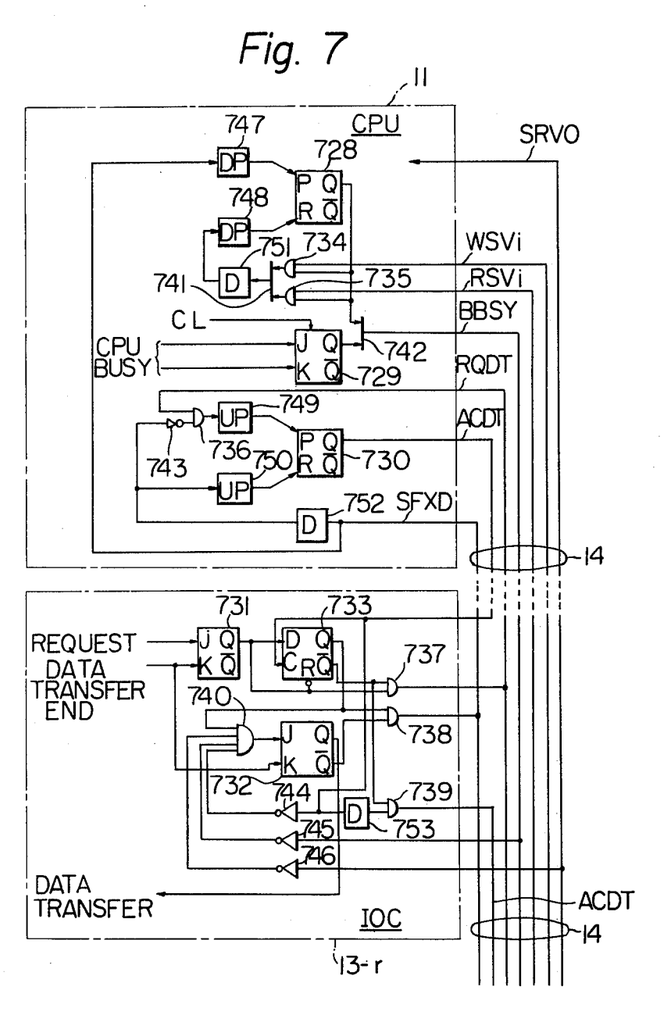
FIG. 7 is a block diagram showing both a part of the central processing unit 11 of FIG. 1 and one of the input/output control units 13-o through 13-n of FIG. 1, both of which operate in accordance with a timing chart shown in FIG. 6.

FIG. 6 depicts a timing chart of a bus occupation request operation for a unit in the data processing system, according to the present invention. FIG. 7 is a block diagram showing both a part of the central processing unit 11 (FIG. 1) and one of the input/output control units 13-o through 13-n, both of which operate in accordance with the timing chart shown in FIG. 6. The operation according to the timing chart shown in FIG. 6 occurs in the data processing system when, for example, a write operation or a read operation for one of the input/output control units is directly interconnected with the memory 12, which operation is the so-called direct memory access (DMA).

In FIG. 7, the reference numerals 11 and 14, respectively indicate the same members which have already been explained by referring to FIG. 1. The reference numeral 13-r indicates an arbitrary one of the input/output control units 13-o through 13-n shown in FIG. 1. The symbols (RQDT), (ACDT) and (SFXD) respectively indicate the signal lines which have already been explained by referring to the table shown in FIG. 2. The symbols (SRVO), (WSVi) and (RSVi) respectively indicate the signal lines which have already been explained by referring to the table shown in FIG. 2 and also to the block diagram shown in FIG. 5. It should be noted that only a part in the central processing unit 11 of FIG. 7 is shown in FIG. 7, and that the reference numerals 728 and 730 respectively indicate modified delay flip-flops; the reference numerals 729, 731 and 732 respectively indicate JK flip-flops; the reference numeral 733 indicates a delay flip-flop; the reference numerals 734 through 740 respectively indicate AND gates; the reference numerals 741 through 742 respectively indicate OR gates; the reference numerals 743 through 746 respectively indicate NOT gates; the reference numerals 747 and 748 respectively indicate signal end detectors; the reference numerals 749 and 750 respectively indicate signal rise detectors; and the reference numerals 751 through 753 respectively indicate delay circuits.

Referring to both FIGS. 6 and 7, when the input/output control unit (IOC) 13-r requests to occupy the common bus 14, a request signal (REQUEST) is applied to the JK flip-flop 731. The IOC 13-r has a DMA function and, accordingly, information can be directly transferred between the IOC 13-r and the memory 12, which is shown in FIGS. 1 and 5. When the JK flip-flop 731 is set to the logic 1 state, since the delay flip-flop 733 is initially in the reset state, the AND gate 737 opens. Then, the request data line (RQDT) attains a logic 1 state (see the timing chart corresponding to RQDT in FIG. 6). In the CPU 11, the logic 1 request signal transmitted over the request data line (RQDT) is applied to the AND gate 736. When the IOC 13-o, . . . 13-r, . . . 13-n does not provide any selection fixed signal, the selection fixed line (SFXD) is in the logic 0 state, and, accordingly, the AND gate 736 opens by means of the NOT gate 743. The delay flip-flop 730 is set to the logic 1 state by the signal supplied from the AND gate 736 by way of the signal rise detector 749, whereby the delay flip-flop 730 provides the acknowledge data signal. Thus, the acknowledge data line (ACDT) acquires the logic 1 state (see the timing chart corresponding to ACDT in FIG. 6). The acknowledge data signal is transferred by way of the IOC 13-o (FIG. 1), . . . 13-r, . . . 13-n (FIG. 1), one after another in sequence. In this case, since the IOC 13-r requests to occupy the common bus 14, the acknowledge data signal is arrested by the IOC 13-r and is not transferred to the IOC units which are located next to the IOC 13-r in a direction along which the acknowledge data signal is being transferred through the acknowledge data line (ACDT). In the IOC 13-r, the acknowledge data signal is transferred by means of the delay flip-flop 733 and the AND gate 739 by way of the delay circuit 753. Once the flip-flop 731 is set to the logic 1 state, and also when the acknowledge data signal is applied to the flip-flop 733, the $\bar{Q}$ output of the flip-flop 733 will acquire the logic 0 state, thereby closing the AND gate 739. Accordingly, the acknowledge data signal cannot be transferred to the IOC units next to the IOC 13-r. At the same time, the AND gate 737 also closes, and the request data signal on the request data line (RQDT) becomes a logic 0 state (see the timing chart RQDT in FIG. 6). Additionally because the Q output of the flip-flop 733 is in the logic 1 state, the AND gate 738 opens. Accordingly, the selection fixed data signal on the selection fixed data line (SFXD) acquires the logic 1 state (see the timing chart corresponding to SFXD in FIG. 6). The selection fixed data signal confirms to the CPU 11 that the IOC 13-r has received the acknowledge data signal correctly. In the CPU 11, the selection fixed data signal is applied to the delay flip-flop 730 by way of the delay circuit 752 and the signal rise detector 750. Thereby, the flip-flop 730 is reset to the logic 0 state. Therefore, the flip-flop 730 cannot be set to the logic 1 state by the request data signal which is provided from the IOC units 13-o through 13-n other than the IOC 13-r which has requested to occupy the common bus 14 now. Thus, the acknowledge data signal acquires the logic 0 state (see the timing chart corresponding to ACDT in FIG. 6).

During that time when the common bus 14 is being occupied by one of the IOC units other than the IOC 13-r, the IOC 13-r, of course, cannot occupy the common bus 14. The IOC 13-r has to wait until the common bus 14 becomes idle. During that time when the common bus 14 is occupied by one of the IOC units other than the IOC 13-r, the service out signal on the service out line (SRVO) is in the logic 1 state and the bus busy signal on the bus busy line (BBSY) is also in the logic 1 state. Accordingly, the AND gate 740 in the IOC 13-r will be closed. This is because the service out line (SRVO) and the bus busy line (BBSY) are connected to the AND gate 740 by way of NOT gates 746 and 745, respectively. When the service out line (SRVO) and the bus busy line (BBSY) respectively attain the logic 0 state, the outputs of both the NOT gates 745 and 746 become logic 1. When the IOC 13-r provides the selection fixed data signal and, accordingly, the IOC 13-r receives the logic 0 acknowledge data signal from the CPU 11, the output of the NOT gate 744 becomes logic 1. The output Q of the delay flip-flop 733 is now logic 1. At this time, the AND gate 740 opens, and the flip-flop 732 is set to the logic 1 state. Thereafter, the desired data transfer (DATA TRANSFER) is conducted by the IOC 13-r. At the same time, since the output $\bar{Q}$ of the JK flip-flop 732 is now in the logic 0 state and the AND gate 738 is closed, the selection fixed data signal SFXD changes to the logic 0 state (see the timing chart corresponding to SFXD in FIG. 6). In the CPU 11, the change of the selection fixed data signal is detected by the signal end detector 747, and the flip-flop 728 is set to the logic 1 state by the signal supplied from the signal end detector 747 (see the timing chart corresponding to BBSY in FIG. 6). Thus, after the IOC 13-r has requested to occupy the common bus, the bus busy signal is provided from the delay flip-flop 728 through the OR gate 742 to the bus busy line (BBSY), whereby the IOC 13-r can occupy the common bus 14. Thereafter, the desired data transfer is conducted by the IOC 13-r (see DATA TRANSFER in FIG. 6). The bus busy signal may also be provided from the CPU 11 through the JK flip-flop 729, and the OR gate 742 to the bus busy line (BBSY) when the CPU 11 occupies the common bus 14.

The operation of the data transfer by the IOC 13-r is the same as that mentioned previously by referring to FIGS. 3, 4 and 5. In this operation, the write service in signal WSVi or read service in signal RSVi acquires the logic 1 state (see the timing chart corresponding to WSVi/RSVi in FIG. 6). In the CPU 11, the write service in signal and the read service in signal are applied to the AND gates 734 and 735, respectively, by way of the corresponding lines (WSVi) and (RSVi). When the write service in signal or the read service in signal is changed to a logic 0 state, the change of the signal is detected by the signal end detector 748 by way of the OR gate 741 and the delay circuit 751. Then, the flip-flop 728 is reset to the logic 0 state by the signal supplied from the signal end detector 748. At this time, the bus busy signal BBSY attains the logic 0 state (see the timing chart corresponding to BBSY in FIG. 6). While, in the IOC 13-r, the flip-flop 731 is reset to the logic 0 state by a data transfer end signal (DATA TRANSFER END).

In the present invention, both the write service in line (WSVi) and the read service in line (RSVi) are individually added to the aforesaid channel (see FIG. 2), and the direction of the data transfer, that is, the write operation or the read operation can be correctly discriminated by detecting the logic states of the write service in line (WSVi) and the read service in line (RSVi). This detection of the logic states is effected by, for example, the timing control circuit 510 in the memory 12 (FIG. 5). Therefore, the write operation and the read operation can be correctly conducted as desired.

In the present invention, the means for providing the bus busy signal BBSY is mounted in the CPU 11, as shown in FIG. 7, where this means is formed by using the elements 728, 734, 735, 741, 742, 747, 748 and 751. However, the means for providing the bus busy signal BBSY is not restricted to be mounted in the CPU 11. The means for providing the bus busy signal may be mounted in a desired one of the IOC units 13-o through 13-r (FIG. 1) or in the memory 12 (FIG. 1). Otherwise, this means may be located individually at a desired position along the common bus 14 (FIG. 1). In the present invention, as mentioned above, only one means for providing the bus busy signal exists in the data processing system. Accordingly, a general control of the bus busy line (BBSY) is performed by this means in the data processing system. As a result, the data processing operation conducted in the system may be simplified, and the occurrences of errors can be easily decreased within the system.

What is claimed is:

1. In a data processing system comprising: a central processing unit, a memory unit, a plurality of input/output control units, and a common bus which may be used alternatively for read and write operations, wherein said central processing unit, said memory unit and said input/output control units are interconnected by way of said common bus, said common bus including at least a data channel for transferring data to be written to said memory, an address channel for transferring address information when data is to be written to or read from said memory, and a tag channel;

the improvement wherein said tag channel includes both a write service in line (WSVi) and a read service in line (RSVi) which are separated from each other, said system including means for transmitting over said write service in line (WSVi) a write service in signal which indicates, when said common bus is used for said write operation, whether or not the information to be transmitted over both said data channel and said address channel are available, and means for transmitting over said read service in line (RSVi) a read service in signal which indicates, when said common bus is used for said read operation, whether or not the information to be transmitted over said address channel is available, whereby said write operation and said read operation are alternately specified in the data processing system by said write service in signal or said read service in signal.

2. A data processing system as set forth in claim 1, wherein a single unit selected from the interconnected said central processing unit, said memory unit and said input/output control units, is provided with a means for providing a common bus busy signal to be transmitted over a bus busy line (BBSY), which common bus busy signal indicates that said common bus is busy, and said common bus busy signal is provided from said providing means after said single unit has requested to occupy said common bus and after such occupation of the common bus is realized.

3. A data processing system as set forth in claim 1, wherein a single unit is further located individually at a desired position along said common bus, which single unit is provided with a means for providing a common bus busy signal to be transmitted over a bus busy line (BBSY), which common bus busy signal indicates that said common bus is busy, and wherein said common bus busy signal is provided from said providing means after one of said central processing unit, said memory unit and said input/output control units has requested to occupy said common bus, and after such occupation of the common bus is realized.

4. A data processing system as set forth in claim 1, wherein a single unit selected from the interconnected said central processing unit, said memory unit and said input/output control units, is provided with a means for providing a common bus busy signal to be transmitted over a bus busy line (BBSY), which common bus busy signal indicates that said common bus is busy and said common bus busy signal is provided from said means after one of said interconnected units other than said single unit has requested to occupy said common bus and after such occupation of the common bus is realized.

5. A data processing system as set forth in claim 2, including an interlock channel for carrying said common bus busy signal.

6. A data processing system as set forth in claim 4, including an interlock channel for carrying said common bus busy signal.

* * * * *

UNITED STATES PATENT AND TRADEMARK OFFICE
CERTIFICATE OF CORRECTION

PATENT NO. : 4,079,354
DATED : March 14, 1978
INVENTOR(S) : Atsushi Nitta

It is certified that error appears in the above-identified patent and that said Letters Patent are hereby corrected as shown below:

```
Column 3, line 50, "date" should be -- data --;
Column 4, line 29, "RSVi)" should be -- (RSVi) --;
Column 5, line 32, after "gate" insert -- 524 --;
Column 5, line 32, "and" (second occurrence) should be -- the --;
Column 6, line 2, before "WSVi')" insert -- ( --;
Column 6, line 12, after "which" insert -- address --;
Column 9, line 15, after "aforesaid" insert -- tag --.
```

Signed and Sealed this

Eighth Day of August 1978

[SEAL]

Attest:

RUTH C. MASON
*Attesting Officer*

DONALD W. BANNER
*Commissioner of Patents and Trademarks*